(No Model.)
P. S. TIPTON.
GATE.
No. 349,187. Patented Sept. 14, 1886.
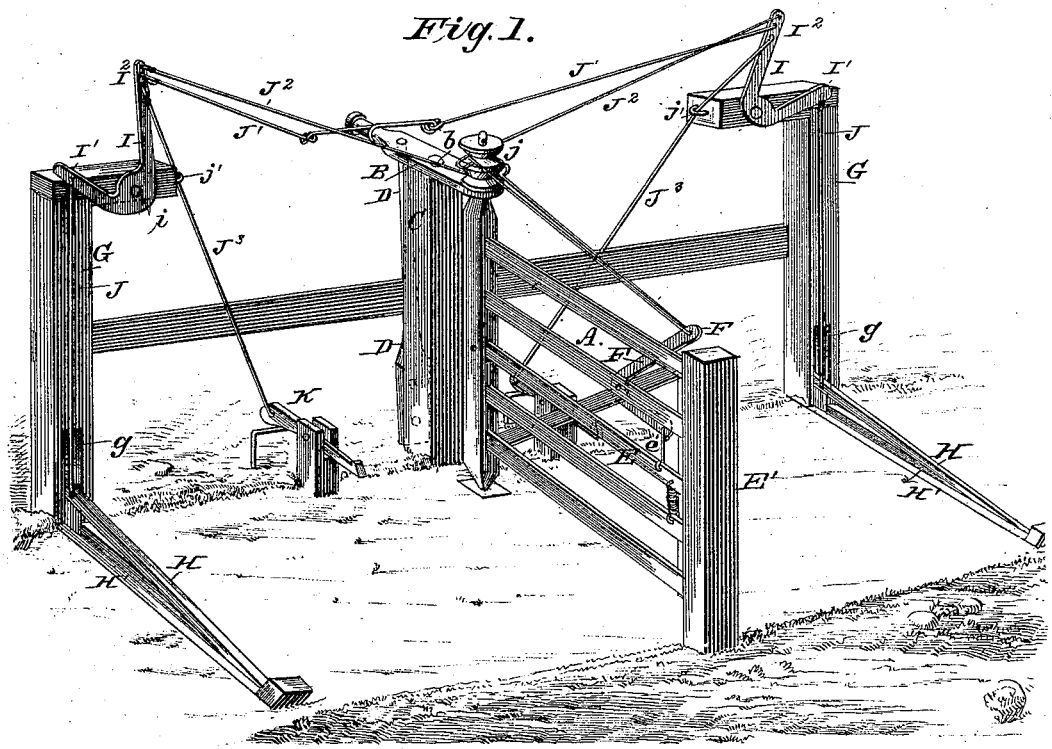
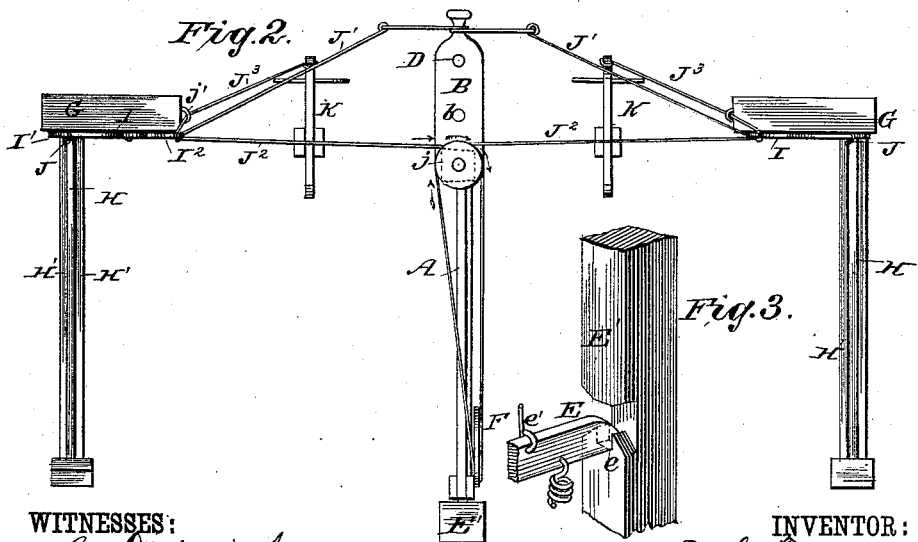
WITNESSES:
Fred. G. Dieterich
P. B. Turpin
INVENTOR:
P. S. Tipton
BY Munn & Co
ATTORNEYS.

UNITED STATES PATENT OFFICE.

PHYLANDER S. TIPTON, OF ANSON, TEXAS.

GATE.

SPECIFICATION forming part of Letters Patent No. 349,187, dated September 14, 1886.

Application filed October 5, 1885. Serial No. 179,073. (No model.)

*To all whom it may concern:*

Be it known that I, PHYLANDER S. TIPTON, a citizen of the United States, residing at Anson, in the county of Jones and State of Texas, have invented a new and useful Improvement in Gates, of which the following is a description.

My invention is an improvement in self-opening gates; and it consists in certain novel constructions and combinations of parts, as will be hereinafter first fully described, and then pointed out in the claims.

In the drawings, Figure 1 is a perspective view, and Fig. 2 a plan view, of my gate; and Fig. 3 is a detached view of a portion of the latch-post, showing the latch-slot therein.

The gate A has its rear end pivoted at its lower end in a suitable support, and its upper end is pivoted to the forward end of a lever, B. This lever B is pivoted at $b$ between its ends to the hinge-post C, and its rear end is engaged by a spring, D, which spring normally holds the lever in position to retain the gate closed.

The gate is provided with a latch-bar, E, arranged to engage the slot $e$ in the latch-post E'. This latch is connected by a suitable rod, chain, or cord, $e'$, with one arm of a bell-crank lever, F.

On each side of the gate I provide posts G G, for supporting the gate-operating devices. Trip-bars H extend across the roadway from the posts G, and have one end arranged and movable vertically in mortises $g$ in the face of such posts. The other ends of the trip-bars rest on the ground or are pivotally supported, as may be desired. Sill-beams H' are seated on opposite sides of the trip-bars, and rest close thereto, operating to exclude all dirt from below the trip-bars.

To each post G is pivoted at $i$ a bell-crank lever, I, having arms I' I². A cord, J, connects the arm I' with the trip-bar, and a cord, J', connects the arm I² with the rear end of the gate-operating lever. A cord, J², is connected at one end with the arm I² or with the cord J', and passes thence around a pulley, $j$, on the gate-pivot, and connects with the latch-operating lever, as shown. To the arm I² of the lever I fix a cord, J³, which passes thence through a guide, $j'$, and connects with the latch K, which may be weighted, as shown, to make it automatic. One of these latches is employed on each side of the gate in position to engage one of the bars thereof and hold the gate open when it is moved to such position.

The operation is simple. When the gate is closed and held by the latch and a vehicle is driven on and depresses the trip-bar, the bell-crank lever first, by the connection described, unlatches the gate, and then the gate-operating lever turns the gate to one side, and it swings open from the approaching vehicle, and is caught by the latch on the opposite side, and is held open for the vehicle to pass through. The vehicle, by its front and rear wheels, will depress the trip-bar long enough for the gate to turn to its full open position. On passing through the gate the vehicle will engage the trip-rod on the opposite side, release the gate-holding latch, and swing the gate to the closed position.

The spring, it will be noticed, eases the motion of the gate and prevents its being damaged by a too forcible opening movement, and operates to return the gate to a closed position when it has been but partially opened.

Manifestly the trip-bars, crank-levers, and other parts of the gate might be made of wood, iron, or other suitable material.

Having thus described my invention, what I claim as new is—

1. The combination of the gate, the sill-beams H', grooved, as described, the trip-bars secured in said grooves and pivotally supported at one end, and connections between the opposite ends of the trip-bars and the gate, substantially as and for the purposes specified.

2. The combination, with the gate and the posts G, having mortises $g$, of the grooved sill-beams H', the trip-bars pivoted at one end in the grooves of beams H', and having their opposite ends movable vertically in mortises $g$, and connections between said trips and the gate, substantially as set forth.

3. In a gate, the combination of the gate proper, the lever B, the latch K, the trips, the levers I, connected with the trips, and the cords connecting the levers I with the lever B and with latches K, substantially as set forth.

PHYLANDER S. TIPTON.

Witnesses:
S. C. HINDS,
J. P. COLE.